US012126606B2

(12) United States Patent
Ingram et al.

(10) Patent No.: US 12,126,606 B2
(45) Date of Patent: Oct. 22, 2024

(54) AUTHENTICATING A VIRTUAL ENTITY IN A VIRTUAL ENVIRONMENT (71) Applicant: Bank of America Corporation, Charlotte, NC (US)

(72) Inventors: Brandon Devon Ingram, Charlotte, NC (US); Joseph Castinado, Northglenn, CO (US); Naoll Addisu Merdassa, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 304 days.

(21) Appl. No.: 17/813,070

(22) Filed: Jul. 18, 2022

(65) Prior Publication Data
US 2024/0022553 A1 Jan. 18, 2024

(51) Int. Cl.
*H04L 9/40* (2022.01)
(52) U.S. Cl.
CPC .................................. *H04L 63/08* (2013.01)
(58) Field of Classification Search
CPC . H04L 63/08; H04L 63/0807; H04L 63/0853; H04L 63/10; H04L 63/107; H04L 63/108; H04L 67/131; H04L 9/32
See application file for complete search history.

(56) References Cited

U.S. PATENT DOCUMENTS

| 8,082,297 | B2 | 12/2011 | Syvain et al. |
| 8,424,065 | B2 * | 4/2013 | Betzler ................... G06F 21/41 726/28 |
| 8,510,806 | B2 * | 8/2013 | Queck ................. G06F 21/6209 713/193 |
| 8,631,417 | B1 | 1/2014 | Mendes Da Costa et al. |
| 9,165,426 | B2 | 10/2015 | Jones et al. |
| 9,253,183 | B2 * | 2/2016 | Nathan ................... H04L 63/08 |
| 9,342,211 | B2 | 5/2016 | Deluca et al. |
| 9,635,008 | B2 * | 4/2017 | Nathan ................... H04L 63/08 |
| 9,900,554 | B2 | 2/2018 | Ursin et al. |
| 10,079,819 | B2 * | 9/2018 | Nathan ................... H04L 63/08 |
| 10,326,667 | B2 | 6/2019 | Jones et al. |
| 10,406,441 | B2 * | 9/2019 | Nathan ................... A63F 13/30 |
| 10,587,584 | B2 | 3/2020 | Vikramaratne et al. |

(Continued)

FOREIGN PATENT DOCUMENTS

| CN | 101496022 B | 5/2012 |
| CN | 102450032 B | 3/2013 |

(Continued)

*Primary Examiner* — Sharon S Lynch (57) ABSTRACT

A system includes a memory and a processor coupled to the memory. The processor is configured to receive a first user credential associated with a user and authorize an avatar of the user to enter a virtual environment. The processor receives a second user credential associated with the user and authorizes the first avatar to access a virtual entity in the virtual environment. The processor receives a request from the user to authenticate the virtual entity and, in response, retrieves user data associated with the user and presents it to the user in the virtual environment. The processor receives an indication from the user that the virtual entity is authentic. The processor then receives a request from the user to perform a virtual data interaction with the virtual entity and initiates the requested data interaction.

20 Claims, 5 Drawing Sheets

(56) References Cited

U.S. PATENT DOCUMENTS

| | | | |
|---|---|---|---|
| 10,610,787 B2 | 4/2020 | Hamilton, II et al. | |
| 10,931,650 B1 | 2/2021 | Mccown et al. | |
| 10,981,069 B2 | 4/2021 | Kawachiya et al. | |
| 11,170,003 B2 | 11/2021 | Wu et al. | |
| 2006/0184651 A1* | 8/2006 | Tirnumala | H04L 67/34 709/229 |
| 2007/0254631 A1 | 11/2007 | Spooner | |
| 2009/0158151 A1* | 6/2009 | Cheng | A63F 13/795 715/706 |
| 2010/0017728 A1* | 1/2010 | Cho | G06F 13/00 715/757 |
| 2010/0053187 A1* | 3/2010 | Arrasvuori | A63F 13/30 345/581 |
| 2010/0153722 A1* | 6/2010 | Bauchot | H04L 9/3263 713/168 |
| 2010/0250383 A1 | 9/2010 | Frazier et al. | |
| 2010/0333031 A1* | 12/2010 | Castelli | G06F 16/95 715/848 |
| 2011/0010675 A1* | 1/2011 | Hamilton, II | A63F 13/335 715/850 |
| 2011/0072367 A1 | 3/2011 | Bauer | |
| 2011/0099608 A1* | 4/2011 | Queck | G06F 21/6209 718/1 |
| 2011/0126272 A1* | 5/2011 | Betzler | G06F 21/41 726/6 |
| 2013/0311565 A1* | 11/2013 | Barry | G06F 21/10 709/204 |
| 2013/0346883 A1* | 12/2013 | Shuster | H04L 65/4015 715/757 |
| 2014/0026078 A1 | 1/2014 | Dawson et al. | |
| 2014/0031011 A1* | 1/2014 | West | G06F 21/6272 455/411 |
| 2014/0282874 A1* | 9/2014 | Bennette | H04L 63/102 726/3 |
| 2015/0143487 A1* | 5/2015 | Nathan | H04L 63/08 726/6 |
| 2016/0219031 A1* | 7/2016 | Nathan | H04L 63/08 |
| 2017/0149780 A1* | 5/2017 | Tellvik | H04L 63/0807 |
| 2017/0339123 A1* | 11/2017 | Nathan | H04L 63/08 |
| 2017/0364920 A1* | 12/2017 | Anand | H04L 63/0861 |
| 2018/0104595 A1 | 4/2018 | Kawachiya et al. | |
| 2018/0123816 A1 | 5/2018 | Tandon et al. | |
| 2019/0253509 A1* | 8/2019 | Kumar | H04L 63/08 |
| 2020/0338458 A1 | 10/2020 | Huang et al. | |
| 2021/0042748 A1 | 2/2021 | Sepulveda et al. | |
| 2022/0270505 A1* | 8/2022 | Carmichael | G09B 7/02 |
| 2022/0351280 A1* | 11/2022 | Cardenas Gasca | G06Q 30/0643 |
| 2022/0385671 A1* | 12/2022 | Silverstein | H04L 63/1408 |
| 2023/0216682 A1* | 7/2023 | Lipton | G06T 13/40 713/172 |
| 2023/0259640 A1* | 8/2023 | Metzler | G06F 21/6218 713/191 |
| 2023/0291740 A1* | 9/2023 | Ashby | H04L 63/083 |
| 2023/0353579 A1* | 11/2023 | Patel | H04L 63/107 |
| 2023/0372830 A1* | 11/2023 | Gillis | A63F 13/79 |
| 2023/0388299 A1* | 11/2023 | Gupta | H04L 63/0861 |
| 2023/0403270 A1* | 12/2023 | Kim | H04L 63/0861 |
| 2023/0409679 A1* | 12/2023 | Rubin | H04L 9/3073 |
| 2024/0004975 A1* | 1/2024 | Bivens | G06F 21/316 |
| 2024/0005011 A1* | 1/2024 | Dhawan | G06F 21/604 |
| 2024/0007464 A1* | 1/2024 | Mavani | H04L 63/0853 |
| 2024/0009574 A1* | 1/2024 | Horstman | A63F 13/79 |
| 2024/0013200 A1* | 1/2024 | Singh | H04L 9/50 |
| 2024/0022599 A1* | 1/2024 | Merdassa | H04L 63/1416 |

FOREIGN PATENT DOCUMENTS

| | | |
|---|---|---|
| CN | 104468741 B | 1/2019 |
| CN | 112446450 A | 3/2021 |
| JP | 2006072952 A | 3/2006 |
| WO | 2020000798 A1 | 2/2020 |

* cited by examiner

AUTHENTICATING A VIRTUAL ENTITY IN A VIRTUAL ENVIRONMENT

TECHNICAL FIELD

The present disclosure relates generally to network communication, and more specifically to authenticating a virtual entity in a virtual environment.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a malicious attack until after the attack has occurred. For example, a bad actor may pretend to be another user in a virtual environment which then allows the bad actor to gain access to other users' information.

SUMMARY

The system and methods implemented by the system as disclosed in the present disclosure provide technical solutions to the technical problems discussed above by allowing a user to perform secure data interactions in a virtual environment. The disclosed system and methods provide several practical applications and technical advantages.

For example, the disclosed system and methods provide the practical application of improving interoperability of real-world systems and virtual world systems (e.g., metaverse systems) so that information may be seamlessly shared between these systems to implement data security, authorization of data interactions and other data interactions performed in real-world and virtual environments. For example, user information collected from a user and/or assigned to the user in a real-world environment may be used in a virtual environment (e.g., metaverse environment) to authenticate the user before allowing the user to access the real-world user information and perform any kind of action or interaction within the virtual environment. Additionally, user information collected from the user and/or assigned to the user in the real-world environment may be used in the virtual environment (e.g., metaverse environment) to authenticate a virtual entity in the virtual environment before allowing virtual data interactions to take place between the user and the virtual entity. This process provides improved information security because it involves two-way authentication including authenticating that an avatar is associated with the user and not some un-authorized third party as well as authenticating that the virtual entity is associated with the intended real-world entity/organization and not some unauthorized entity, before a data interaction can take place between the user and the virtual entity. This two-way authentication is important to help ensure that both parties engaged in a virtual interaction session are genuine parties and to avoid data scams including theft of user data and data objects.

Thus, the disclosed system and methods improve data security in the virtual environment. By improving data security in virtual environment, the disclosed system and methods generally improve technology related to performing secure data interactions in a virtual environment.

The disclosed system and methods provide the additional practical application of saving memory resources. The seamless data flow between the real-world systems and virtual-world systems as a result of interoperability of these systems allows each system to store less data by avoiding the same data to be stored in both system, as data stored in one system can be accessed by the other system. This saves memory resources by avoiding duplication of data. The saving of memory resources may leave more system memory for storing critical data for use in data processing. This provides the additional technical advantage of improving processing efficiency of computing systems that manage the real-world and virtual word environments.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
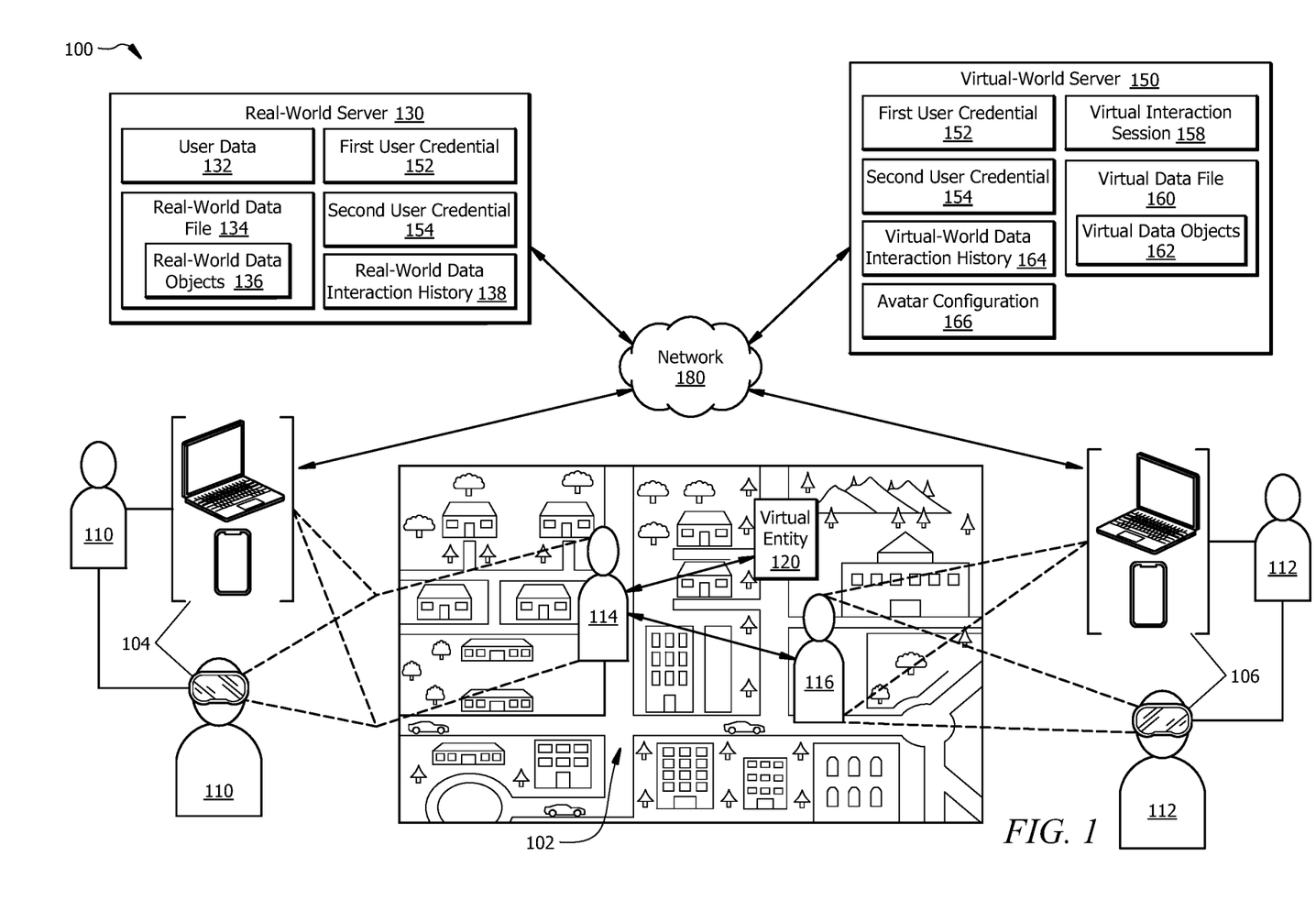
FIG. 1 is a schematic diagram of a system, in accordance with certain aspects of the present disclosure.

FIG. 1 is a schematic diagram of a system 100, in accordance with certain aspects of the present disclosure. System 100 may include a first user device 104, a second user device 106, real-world server 130, and virtual-world server 150 each connected to a network 180. A first user 110 is associated with the first user device 104 and a second user 112 is associated with the second user device 106. The system 100 may be communicatively coupled to the communication network 180 and may be operable to transmit data between each one of the first user device 104, second user device 106, real-world server 130, and virtual-world server 150 through the communication network 180.

In general, the system 100 may improve interoperability of real-world systems and virtual world systems (e.g., metaverse systems) so that information may be seamlessly shared between these systems to implement data security, authorization of data interactions and other data interactions performed in real-world and virtual environments. For example, user information collected from the user and/or assigned to the user in a real-world environment may be used in a virtual environment 102 (e.g., metaverse environment) to authenticate the first user 110 before allowing the first user 110 to access the real-world user information and perform any kind of action or interaction within the virtual environment 102. Additionally or alternatively, as described in embodiments of the present disclosure, user information collected from the first user 110 and/or assigned to the first user 110 in the real-world environment may be used in the virtual environment 102 (e.g., metaverse environment) to authenticate a virtual entity 120 before allowing virtual data interactions to take place between the first user 110 and the virtual entity 120. This process provides improved information security because it involves two-way authentication including authenticating the first user 110 to the virtual entity 120 as well as authenticating the virtual entity 120 to the first user 110, before a data interaction can be performed in the virtual environment 102 between the first user 110 and the virtual entity 120.

It may be noted that the terms "real-world" and "real-world environment" in this disclosure refer to any non-virtual environment where users (e.g., users 110 and 112) can physically interact with real persons and objects. A real-world data interaction may refer to any data interaction performed outside the virtual environment 102 (e.g., a metaverse environment). Further, it may be noted that while certain embodiments of the present disclosure may be described in the context of a metaverse environment which is an example of a virtual environment 102, the methods discussed in this disclosure apply to any other virtual environment 102. The terms "virtual environment" and "metaverse environment" are used interchangeably throughout this disclosure. Furthermore, it may be noted that while certain embodiments of this disclosure describe one or more operations in relation to the first user 110, these embodiments apply to any user (e.g., second user 112) connected to network 180.

The first user 110 may access the virtual environment 102 (e.g., a metaverse environment) through the first user device 104. The first user device 104 is configured to display a two-dimensional (2D) or three-dimensional (3D) representation of the virtual environment 102 to the first user 110. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar (such as the first avatar 114 for the first user 110). An avatar is a graphical representation of a user at a virtual location within the virtual environment 102. In embodiments, the virtual location of the avatar may be correlated to the physical location of a user in the real-world environment. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. By using an avatar, a user is able to move within the virtual environment 102 to interact with one or more avatars and objects within the virtual environment 102 while independently remaining at a physical location in the real-world environment or being in transit in the real-world environment.

While engaging in the virtual environment 102 via the first avatar 114, the first user 110 may interact with a plurality of other users, objects and/or entities (e.g., virtual entity 120) through a respective avatar. For example, the second user 112 may attempt to engage in an interaction session with the first avatar 114 through a second avatar 116 associated with the second user 112. In the real-world environment, the second user 112 may be physically located at a distance away from the first user 110. The second user 112 may access the virtual environment 102 through the second user device 106 to control the second avatar 116 and attempt to engage in an interaction session with the first user 110 through the first avatar 114.

Before the interaction between the first avatar 114 and the second avatar 116 or virtual entity 120 occurs, the virtual-world server 150 may authenticate that the first avatar 114 is associated with the first user 110 and not some unauthorized third-party. For example, the first user 110 may be required to sign into a secure portal that provides access to a data file (e.g., real-world data file 134 and/or virtual data file 160) associated with the first user 110. As shown in FIG. 1, the real-world data file 134 of the first user 110 is stored and managed by the real-world server 130 and the virtual data file 160 is stored and managed by the virtual-world server 150. In one or more embodiments, the virtual-world server 150 may employ single sign-on (SSO), multifactor authentication, or any other suitable authentication scheme in order to allow the first user 110 access to the virtual data file 160 and/or the real-world data file 134. The virtual data file 160 and the real-world data file 134 may include virtual data objects 162 and real-world data objects 136 respectively owned by the first user 110. The real-world server 130 and the virtual-world server 150 may store other information related to the first user 110 including, but not limited to, user profile information, account information (e.g., including identity and other details relating to the respective data files 134 and 160), avatar information, digital assets (e.g., respective real-world data objects 136 and virtual data objects 162) information, or any other suitable type of information that is associated with a user within the virtual environment 102 and/or the real-world environment.

Each of the real-world server 130 and the virtual-world server 150 is generally a suitable server (e.g., including a physical server and/or virtual server) operable to store data in a memory and/or provide access to application(s) or other services. One or both of the real-world server 130 and the virtual-world server 150 may be a backend server associated with a particular entity (e.g., organization) that facilitates conducting interactions between entities and one or more users. In other embodiments, one or both of the real-world server 130 and the virtual-world server 150 may be organized in a distributed manner, or by leveraging cloud computing technologies. Real-world server 130 may store information which is primarily used to support data interactions performed in the real-world environment. Virtual-world server 150 may store information which is primarily used to support data interactions performed in the virtual environment 102 (e.g., a metaverse environment). It may be noted that the operations performed by the real-world server 130 and the virtual-world server 150 described in embodiments of the present disclosure may be implemented by a single server.

The communication network 180 may facilitate communication within the system 100. This disclosure contemplates the communication network 180 being any suitable network operable to facilitate communication between the first user device 104, second user device 106, real-world server 130 and the virtual-world server 150. Communication network 180 may include any interconnecting system capable of transmitting audio, video, signals, data, messages, or any combination of the preceding. Communication network 180 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the user devices (i.e., first user device 104 and second user device 106) may be any computing device configured to communicate with other devices, such as a server (e.g., real-world server 130 and/or virtual-world server 150), databases, etc. through the communication network 180. Each of the user devices may be configured to perform specific functions described herein and interact with one or both of real-world server 130 and the virtual-world server 150, e.g., via its user interfaces. Each of the user devices is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user devices may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user to send requests to one or both of real-world server 130 and the virtual-world server 150, or to another user device.

Example User Device

Figure 2:
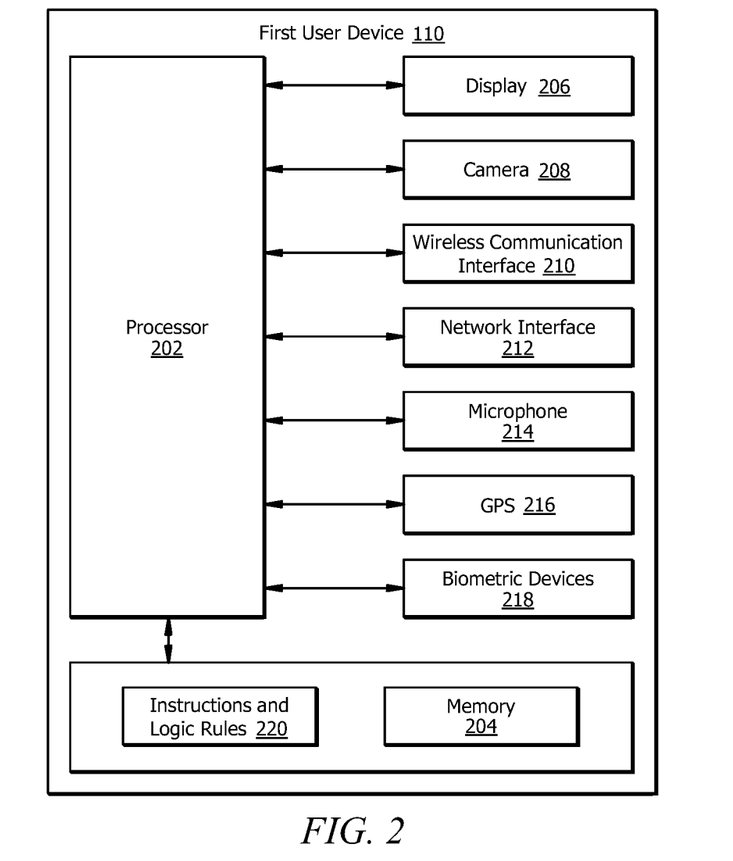
FIG. 2 is a block diagram of an embodiment of the first user device used by the system of FIG. 1.

FIG. 2 is a block diagram of an embodiment of the first user device 104 used by the system of FIG. 1. First user device 104 may be configured to display the virtual environment 102 (referring to FIG. 1) within a field of view of the first user 110 (referring to FIG. 1), capture biometric, sensory, and/or physical information of the first user 110 wearing the first user device 104, and to facilitate an electronic interaction between the first user 110 and the second user 112 (referring to FIG. 1).

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the real-world server 130 and/or virtual-world server 150 shown in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect hand gestures, identify virtual objects selected by a detected hand gesture, capture biometric information of a user, such as first user 110, via one or more of camera 208, microphone 214, and/or biometric devices 218, and communicate via wireless communication interface 210 with the real-world server 130, virtual-world server 150 and/or second user device 106. In some embodiments, the function described herein is implemented using logic units, FPGAs, ASICs, DSPs, or any other suitable hardware or electronic circuitry.

Figure 3:
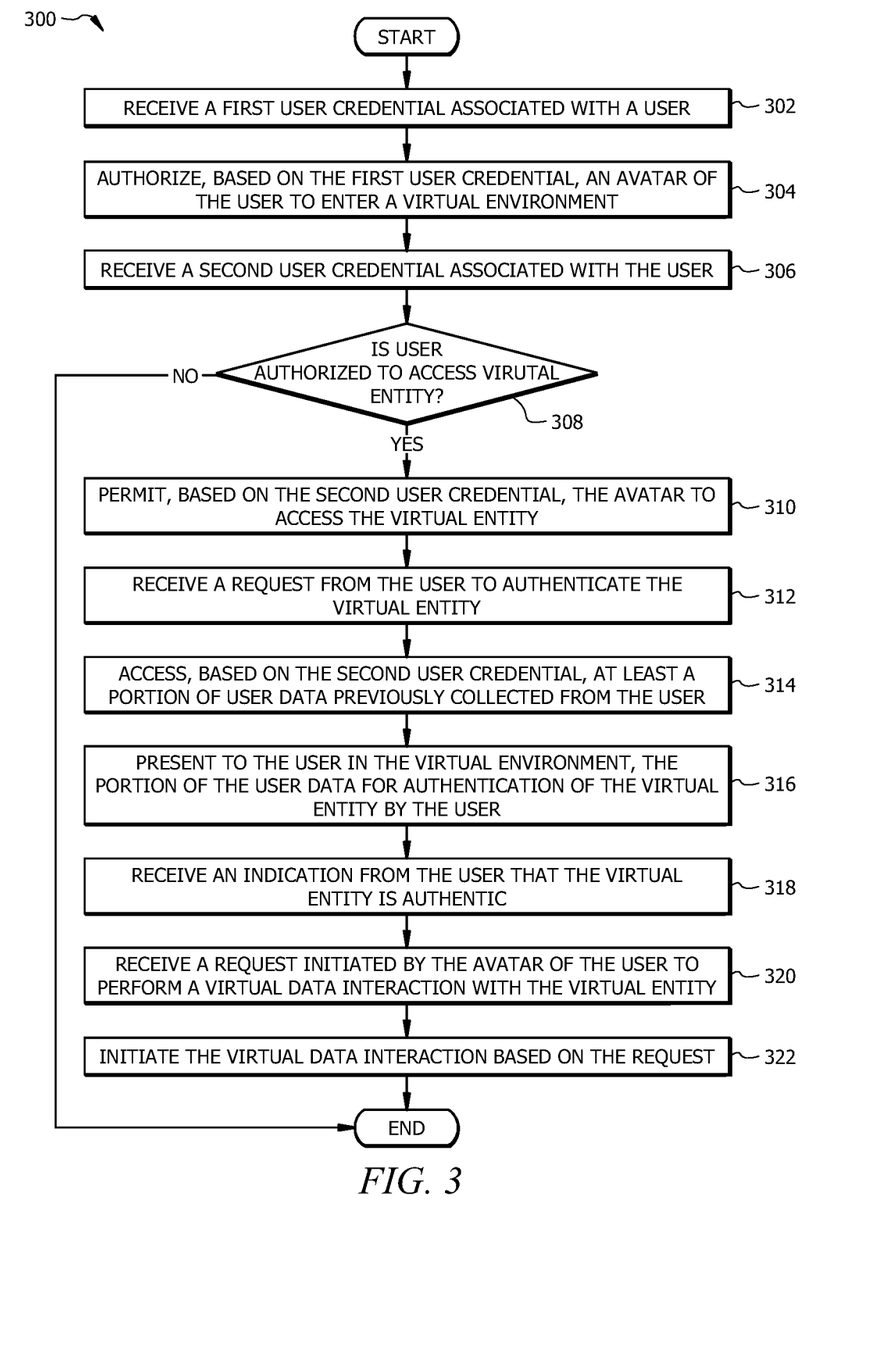
FIG. 3 illustrates a flowchart of an example method for verifying an identity of a user and an identity of a virtual entity in a virtual environment, in accordance with one or more embodiments of the present disclosure.

The memory 204 is operable to store any of the information described with respect to FIGS. 1 and 3 along with any other data, instructions, logic, rules, or code operable to implement the function(s) described herein when executed by processor 202. For example, the memory 204 may store the instructions 220. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, information relating to the identity of the user (e.g., at least a portion of user data 132), instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 110 in FIG. 1) in a virtual reality environment, an augmented reality environment or mixed reality environment. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 110. Camera 208 may be configured to capture images continuously, at predetermined intervals, or on-demand. For example, camera 208 may be configured to receive a command from first user 110 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as second user device 106, the real-world server 130 and/or virtual-world server 150 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 110. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 110, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners, fingerprint scanners and facial scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Referring back to FIG. 1, in one or more embodiments, one or both of the real-world server 130 and the virtual-world server 150, and one or more user devices (e.g., second user device 106) may be part of an Information Technology (IT) infrastructure of an entity or organization. For example, second user 112 may be a representative of the organization who may use the second user device 106 to enter the virtual environment 102 and virtually interact with one or more users (e.g., first user 110) via the second avatar 116 to provide services to the first user 110.

The real-world server 130 may be configured to allow users (e.g., first user 110) registered with the real-world server 130 to perform one or more data interactions in the real-world environment. Similarly, virtual-world server 150 may be configured to allow users (e.g., first user 110) registered with the virtual-world server 150 to perform one or more data interactions in the virtual environment 102 (e.g., a metaverse environment). In one embodiment, the real-world server 130 and the virtual-world server 150 are owned and/or operated by the same entity/organization. In this context, virtual-world server 150 may be configured to allow users (e.g., first user 110) registered with the real-world server 130 to perform one or more data interactions in the virtual environment 102 (e.g., a metaverse environment). In alternative embodiments, the real-world server 130 and the virtual-world server 150 may be owned and/or operated by different entities/organizations.

In one or more embodiments, as the first user 110 initially registers with the real-world server 130 in the real-world environment, the real-world server 130 may collect several pieces of information from the user including information relating to the identity of the user such as legal name, social security number, biometrics (e.g., fingerprints, retina scans, face ID etc.), residence address, phone numbers, assets owned by the user, and copies of government issued documents (e.g., driver license, state identity card etc.). This information is stored by real-world server 130 as part of user data 132 of the first user 110. In one embodiment, at least a portion of the user data 132 relating to the first user 110 collected in the real-world environment may be stored in the virtual-world server 150. Once the identity of the first user 110 is confirmed and all other information provided by the first user 110 is verified to be correct, the real-world server 130 may generate a real-world data file 134 for the first user 110 in which the first user 110 may store real-world data objects 136 owned by the first user 110. In one example, the first user 110 may engage in a real-world interaction with a service representative managing the real-world server 130 (e.g., physical interaction at an office location, over phone, voice chat etc.) to provide such information that can be used to register the first user 110 at the real-world server 130 and generate the real-world data file 134 of the first user 110. In another example, the first user 110 may engage in a real-world interaction by accessing a webpage provided and managed by the real-world server 130. Once the first user 110 initiates a registration process via the webpage, the real-world server 130 may walk the first user 110 through several steps in which the first user 110 may be asked to provide information necessary to verify the identity of the first user 110 and register the first user 110 with the real-world server 130.

Information relating to the real-world data file 134 of the first user 110 may be stored as part of the user data 132 of the first user 110. This information may include, but is not limited to, an identity of the real-world data file 134, amount of real-world data objects 136 stored in the real-world data file 134, a log of data interactions conducted in relation to the real-world data file 134 and any other information relating to the real-world data file 134.

Once registered with the real-world server 130, the real-world server 130 may allow the first user 110 to perform one or more data interactions in the real-world environment. For example, a real-world data interaction may include transferring one or more real-world data objects 136 from the real-world data file 134 of the first user 110 to a second real-world data file (not shown) of the second user 112. Another example data interaction may include receiving one or more real-world data objects 136 in the real-world data file 134 of the first user 110 from the second real-world data file of the second user 112. Another example data interaction may include requesting by the first user 110 transfer of real-world data objects from a data file of a second user to a user data file of a third user as part of satisfying an agreement between the first user 110 and the third user. Another example data interaction may include modifying at least a portion of the user data 132 (e.g., user credentials to access the real-world server, phone numbers, residential address, email address, information relating to user assets etc.) stored at the real-world server 130. It may be noted that a data interaction in accordance with embodiments of the present disclosure refers to any interaction in the real-world environment and/or virtual environment 102 that includes transfer of data between computing nodes (e.g., first user device 104, second user device 106, real-world server 130 and virtual-world server 150).

In one or more embodiments, real-world server 130 may be configured to record real-world data interactions performed by the first user 110 in the real-world environment. The recorded real-world data interactions may be stored as part of real-world data interaction history 138 of the first user 110. Each data interaction record stored in the real-world data interaction history 138 may relate to a distinct real-world data interaction performed by the first user 110 and may include information relating to the real-world data interaction including, but not limited to, a type of data interaction (e.g., sending real-world data objects 136, receiving real-world data objects 136, updating user data 132 etc.), a date and time the data interaction was performed, an identity of a sending data file (e.g., real-world data file 134), an identity of a receiving data file (e.g., real-world data file 134), an amount of real-world data objects 136 transferred (e.g., sent or received), and an identity of an entity or user (e.g., second user 112) with which the data interaction was performed.

The first user 110 may additionally register with the virtual-world server 150. In one embodiment, when initially registering with the virtual-world server 150, the first user 110 may provide to the virtual-world server 150 a credential (e.g., username and password) that provides the first user 110 access to the real-world server 130. In one embodiment, a single web page or web portal may allow the first user 110 to register with the real-world server 130 as well as the virtual-world server 150. The first user 110 may first register with the real-world server 130 as described above and generate credentials that allow the user access to the real-world server 130 and services provided by the real-world server. Once registered with the real-world server 130, the web portal may offer the first user 110 an option to additionally register with the virtual-world server 150 which may allow the first user 110 to perform data interactions in the virtual environment 102. Registration with the virtual-world server 150 may include generating a first user credential 152 that allows the first user 110 to sign on to the virtual-world server 150 and enter the virtual environment 102 via first avatar 114 of the first user 110. Once registered with the virtual-world server 150, the first user 110 may generate a virtual data file 160 in which the first user 110 may store virtual data objects 162 owned by the first user 110. In one or more embodiments, the virtual data file 160 of the first user 110 is associated with the real-world data file 134 of the first user 110. For example, the virtual data file 160 is a virtual image of the real-world data file 134, wherein the virtual data objects 162 correspond to the real-world data objects 136. In other words, the virtual data file 160 is a virtual representation of the real-world data file 134. In another example, the virtual data file 160 stores a portion of the real-world data objects 136 in the form of virtual data objects 162. In another example, real-world data objects 136 may be converted to virtual data objects 162, and vice versa. In this case, there may not be a one-to-one conversion between the real-world data objects 136 and virtual data objects 162. For example, one real-world data object 136 may be converted to a plurality of virtual data objects 162, wherein the conversion ration may dynamically change from time to time.

Information relating to the virtual data file 160 of the first user 110 may be stored by the virtual-world server 150. This information may include, but is not limited to, an identity of the virtual data file 160, amount of virtual data objects 162 stored in the virtual data file 160, a log of virtual data interactions conducted in the virtual environment 102 in relation to the virtual data file 160 and any other information relating to the virtual data file 160.

Once registered with the virtual-world server 150, the virtual-world server 150 may allow the first user 110 to perform one or more virtual data interactions. For example, a virtual data interaction may include transferring one or more virtual data objects 162 from the virtual data file 160 of the first user 110 to a second virtual data file (not shown) of the second user 112. Another example data interaction may include receiving one or more virtual data objects 162 in the virtual data file 160 of the first user 110 from the second virtual data file of the second user 112. Another example data interaction may include requesting by the first user 110 transfer of virtual data objects from a data file of a second user to a data file of a third user as part of satisfying an agreement between the first user 110 and the third user.

In one or more embodiments, the virtual data file (e.g. virtual data file 160) is a software application running on a computing node owned and/or operated by the respective user (e.g., first user 110). For example, when the first user 110 desires to receive virtual data objects 162 from a virtual data file of the second user 112, first user 110 may direct the second user 112 to a unique cryptographic address (e.g., public key) issued by the virtual data file 160. In one embodiment, the virtual data file 160 may not itself store the virtual data objects 162 but may store information that points to a location of the virtual data objects 162, for example, on a server (e.g., virtual-world server 150). Virtual data file 160 may be web-based or hardware-based. For example, virtual data file 160 may be stored in a mobile device or a desktop computer connected to the internet. Additionally or alternatively, virtual data file 160 may be stored in a device (e.g., USB drive) that is not connected to the network 180.

In one or more embodiments, virtual-world server 150 may be configured to record virtual-world data interactions performed by the first user 110 in the virtual environment 102. The recorded virtual-world data interactions may be stored as part of virtual-world data interaction history 164 of the first user 110. Each virtual-world data interaction record stored in the virtual-world data interaction history 164 may relate to a distinct virtual-world data interaction performed by the first user 110 and may include information relating to the virtual-world data interaction including, but not limited to, a type of the data interaction (e.g., sending virtual data objects 162, receiving virtual data objects 162, updating user data 132 etc.), a date and time the data interaction was performed, an identity of a sending data file (e.g., virtual data file 160), an identity of a receiving data file (e.g., virtual data file 160), an amount of virtual data objects 162 transferred (e.g., sent or received), and an identity of an entity (e.g., virtual entity 120) or user (e.g., second user 112) with which the data interaction was performed.

Data security is important in any system that supports online data interactions between computing nodes of the system. Online data interactions in real-world environments have existed for several decades and robust measures are already in place to ensure data security in real-world systems. However, metaverse technology is relatively new and data security is a challenge in metaverse systems as the development of metaverse related technologies is still at a nascent stage and standardized systems that provide robust data security are not yet in place.

In one or more embodiments, an entity/organization that owns and/or manages the virtual-world server 150 may be represented in the virtual environment 102 as a virtual entity 120. Virtual entity 120 may take any form in the virtual environment 102 including, but not limited to, a device, a building, a room, a person, an object or any other form. First user 110 may engage in a virtual interaction session 158 with the virtual entity 120 to perform one or more virtual data interactions managed by the virtual-world server 150. In one example, the virtual entity 120 may be a virtual device having a virtual user interface that can accept user input and display information to the first user 110. The virtual user interface of the virtual user device may include virtual buttons, a virtual touch pad, a virtual touch screen or any other input means for the first user 110 to provide inputs to the virtual device. The virtual device may additionally include a virtual display that can display information to the first user 110. The first user 110 may use the virtual user interface to perform one or more virtual data interactions managed by the virtual-world server 150.

In some cases, the virtual entity 120 may be associated with a virtual avatar that can interact with the first avatar 114 of the first user 110 and help the first user 110 to perform virtual data interactions. First user 110 may engage in a virtual interaction session 158 with the virtual entity 120 through the virtual avatar to perform one or more virtual data interactions managed by the virtual-world server 150. For example, the virtual avatar may be similar to the second avatar 116 of the second user 112, but digitally created to represent the virtual entity 120 and automatically run by an artificial intelligence (AI) algorithm. In one embodiment, the virtual avatar may take a human form that can interact with the first avatar 114 of the first user 110 using voice communication. The virtual avatar may be configured to respond to voice commands of the first user 110 and perform virtual data interactions requested by the first user 110.

When the first user 110 engages through the first avatar 114 in a virtual interaction session 158 with the virtual entity 120 (e.g., through virtual device and/or a virtual avatar of the virtual entity 120) in the virtual environment 102, before a virtual data interaction is performed, it is important to authenticate that the first avatar 114 is associated with the first user 110 and not some un-authorized third party. Additionally, it also important to authenticate that the virtual entity 120 and/or the virtual avatar of the virtual entity 120 is associated with the intended real-world entity/organization and not any other unauthorized virtual or real-world entity/organization. This two-way authentication is important to help ensure that both parties engaged in the virtual interaction session 158 are genuine parties and to avoid data scams including theft of user data and data objects (e.g., virtual data objects 162 and/or real-world data objects 136).

Embodiments of the present disclosure leverage user data collected and/or assigned in a real-world environment and/or virtual environment for providing data security in the virtual environment.

In one or more embodiments, virtual-world server 150 may be configured to use a first user credential 152 collected from the first user 110, generated by the first user 110 or assigned to the first user 110 during real-world data interactions with the first user 110, to verify identity of the first user 110 in the virtual environment 102. Thus, the first user credential 152 provides the first user 110 access to the virtual environment 102. For example, the first user credential 152 may be used by the virtual-world server 150 to verify that the first avatar 114 belongs to and is controlled by the first user 110.

In one example, a retina scan of the first user 110 may have been previously collected from the first user 110 as part of a real-world data interaction with the first user 110. Information relating to the retina scan may have been stored as part of the user data 132. The retina scan of the first user 110 may be used as the first user credential 152. When the first user 110 uses the user device 104 (e.g., VR headset) to enter the virtual environment 102 via first avatar 114, the virtual-world server 150 obtains a retina scan of the first user 110 using a biometric device (e.g., biometric device 218) provided at the user device 104. The retina scan obtained via the user device 104 is compared with the retina scan of the first user 110 stored as part of user data 132 in the real-world server 130. When the two retina scans match, virtual-world server 150 determines that the first avatar 114 is associated with the first user 110 and may authorize and allow the first avatar 114 to enter the virtual environment 102.

In another example, first user credential 152 may include a username and password generated by the first user 110 as part of registering with the real-world server 130. The virtual-world server 150 may allow the first user 110 to use the same username and password to enter the virtual environment 102 via first avatar 114.

Virtual-world server 150 may be configured to generate a second user credential 154 that provides the first user 110 access to the virtual entity 120 within the virtual environment 102 and authorization to perform one or more virtual data interactions using the virtual entity 120. The second user credential 154 may include a passcode, a virtual token, an encrypted key, biometrics, multi-factor authentication or any other form of authentication. In one embodiment, first user 110 first enters the virtual environment 102 (e.g., via first avatar 114) using the first user credential 152 and then accesses the virtual entity 120 using the second user credential 154. Once the first avatar 114 of the first user 110 has accessed the virtual entity 120, first user 110 may perform one or more data interactions in the virtual environment 102 using the virtual entity 120.

Once the first user 110 has access to the virtual entity 120 (e.g., after providing the second user credential 154), the first user 110 may want to authenticate that the virtual entity 120 is associated with a genuine real-world entity/organization that the virtual entity 120 is supposed to represent and first user 110 intends to interact with, and not some unauthorized entity/organization or person. Virtual-world server 150 may be configured to authenticate the identity of the virtual entity 120 by presenting to the first user 110 information that was previously collected from the first user 110 or assigned to the first user 110 as part of a real-world data interaction in the real-world environment or virtual-world data interaction in the virtual environment 102. In one embodiment, the second user credential 154 may be associated with user information relating to the first user 110 stored in the real-world server 130 as well as the virtual-world server 150. The user information associated with the second user credential 154 may include user data 132 of the first user 110, real-world data interaction history 138 of first user 110, virtual-world data interaction history 164 of first user 110 and/or any other information the first user 110 previously provided to the real-world server 130 or virtual-world server 150, any information generated for the first user 110 by the real-world server 130 or virtual-world server 150 or any information the first user 110 provided access to the real-world server 130 or virtual-world server 150. When the first user 110 provides the second user credential 154 to gain access to the virtual entity 120, virtual-world server 150 may determine an identity of the first user 110 based on the user information associated with the second user credential 154. Upon request from the first user 110 to authorize the virtual entity 120, the virtual-world server 150 may retrieve a portion of the user information as stored in real-world server 130 and/or virtual-world server 150 and may present the retrieved information to the first user 110 in the virtual environment 102. An unauthorized entity or user may not possess or have access to the user information that the real-world server 130 or virtual-world server 150 may have access to. Thus, the virtual-world server 150 presenting a portion of the user information to the first user 110 is indicative of the fact that the virtual entity 120 is associated with a genuine real-world entity/organization. Based on the user information presented to the first user 110 in the virtual environment 102 (e.g., visually inspecting the presented user information), the first user 110 may confirm to the virtual-world server 150 that the virtual entity 120 is authenticated, and thereafter, may proceed to perform one or more virtual data interactions.

In one embodiment, virtual entity 120 may provide a means for the first user 110 to request the authentication of the virtual entity 120. For example, when the virtual entity 120 is a virtual device, the virtual device may include a virtual button that the first user 110 may press through the first avatar 114 to request authentication of the virtual entity 120. In another example, when the first user 110 is interacting with a virtual avatar of the virtual entity 120, the first user 110 may request authentication of the virtual entity 120 using a voice command to the virtual avatar. In response, to receiving the request for authentication of the virtual entity 120 from the first user 110, virtual-world server 150 may access the real-world server 130, extract a portion of the user information and present the extracted portion of the user information to the first user 110 in the virtual environment 102. For example, virtual-world server 150 may display the extracted user information on a virtual display associated with the virtual entity 120. The first user 110 may inspect the presented user information and authorize the virtual entity 120 (e.g., by pressing a virtual button or via voice command) upon recognizing the user information.

The user information that may be presented to the first user 110 for authenticating the virtual entity may include, but is not limited to, one or more of an identity of a data file (e.g., real-world data file 134 or virtual data file 160) owned by the first user 110, an amount of data objects (e.g., real-world data objects 136 or virtual data objects 162) held in the respective data file, a record of one or more data interactions (e.g., real-world data interaction or virtual-world data interaction) previously performed by the first user 110, a safe password previously configured by the first user 110, an answer to a secret question previously provided by the first user 110, biometric information of the first user 110, a security image previously selected by the first user 110, a security word previously provided by the first user 110, a security phrase previously provided by the first user 110, an audio file, a video file.

In one or more embodiments, in response to receiving a request to authenticate the virtual entity 120 by the first user 110, virtual-world server 150 may be configured to extract one or more records stored in the real-world data interaction history 138 and/or virtual-world data interaction history 164. Each data interaction record stored in the real-world data interaction history 138 may relate to a distinct real-world data interaction performed by the first user 110 and may include information relating to the real-world data interaction including, but not limited to, a type of data interaction (e.g., sending real-world data objects 136, receiving real-world data objects 136, updating user data 132 etc.), a date and time the data interaction was performed, an identity of a sending data file (e.g., real-world data file 134), an identity of a receiving data file (e.g., real-world data file 134), an amount of real-world data objects 136 transferred (e.g., sent or received), and an identity of an entity or user (e.g., second user 112) with which the data interaction was performed. Similarly, each virtual-world data interaction record stored in the virtual-world data interaction history 164 may relate to a distinct virtual-world data interaction performed by the first user 110 and may include information relating to the virtual-world data interaction including, but not limited to, a type of the data interaction (e.g., sending virtual data objects 162, receiving virtual data objects 162, updating user data 132 etc.), a date and time the data interaction was performed, an identity of a sending data file (e.g., virtual data file 160), an identity of a receiving data file (e.g., virtual data file 160), an amount of virtual data objects 162 transferred (e.g., sent or received), and an identity of an entity (e.g., virtual entity 120) or user (e.g., second user 112) with which the data interaction was performed.

Virtual-world server 150 may be configured to present to the first user 110 in the virtual environment 102, information from the extracted records of the one or more real-world data interactions and/or virtual world data interactions. For example, virtual-world server 150 may extract and present to the first user 110 information relating to a virtual data interaction performed by the first user 110 including transfer of virtual data objects 162 from virtual data file 160 to an entity in the virtual environment. The presented information may include a date and time the data interaction was performed, a type of the data interaction (e.g., transfer of virtual data objects), the identity of the sending virtual data file 160 and an identity of the receiving entity. The first user knows that since the data interaction was processed by the virtual-world server 150, the virtual-world server 150 may possess information relating to the data interaction, and no other unauthorized entity may possess this information. Thus, upon the virtual-world server 150 presenting information relating to the data interaction to the first user 110, the first user 110 may know that the virtual entity 120 is associated with a genuine entity and may indicate that the virtual entity 120 is authenticated.

In one example, virtual-world server 150 may extract and present to the first user 110 one or more most recent real-world data interactions and/or virtual world data interactions performed by the first user 110. There is a higher likelihood that the first user 110 remembers the most recent one or more data interactions performed by the first user 110. Thus, the first user 110 may promptly authenticate the virtual entity 120 upon such information being presented to the first user 110.

Virtual-world server 150 may be configured to allow first user 110 to configure a virtual avatar associated with the virtual entity 120 to generate a customized virtual avatar. The customized virtual avatar is associated with a user profile of the first user 110 and visually represents the virtual entity 120 when engaged with the first avatar 114 of the first user 110 in the virtual environment 102. In other words, instead of interacting with a standard virtual avatar associated with the virtual entity 120, the first user 110 may configure the standard virtual avatar in accordance with user preferences of the first user 110 to generate a customized virtual avatar and interact with the customized virtual avatar. While the standard virtual avatar may be shown to all users who have not customized the standard virtual avatar, the customized virtual avatar configured by the first user 110 is associated with the user provide of the first user 110 and shown only to the first user 110.

Virtual-world server 150 may receive a request from the first user 110 to configure the virtual avatar associated with the virtual entity 120. The first user 110 may send the request from the user device 104. The request may include one or more preferences to change one or more attributes associated with the virtual avatar. The attributes may include features and characteristics of the virtual avatar that decide a visual appearance of the virtual avatar in the virtual environment 102. For example, a size, shape, color, attire, accessories, or any other suitable type of appearance features may be specified by the first user 110. Upon receiving the request from the first user 110, virtual-world server 150 may be configured to generate an avatar configuration 166 based on the preferences stated in the request. For example, avatar configuration 166 may be an executable file that is configured to generate a customized virtual avatar based on the preferences of the first user 110. Virtual-world server 150 may associate the avatar configuration 166 to the user profile of the first user 110.

When the first user 110 request that the virtual entity 120 be authenticated, virtual-world server 150 detects that the avatar configuration 166 associated with the user profile of the first user 110, for example, based on the second user credential 154 provided by the first user 110. Virtual-world server 150 retrieves the avatar configuration 166 and generates a customized virtual avatar based on the preferences of the first user in the avatar configuration 166. Virtual-world server 150 presents the customized virtual avatar to the first user 110 in the virtual environment 102. Upon seeing the customized virtual avatar in accordance with preferences previously configured by the first user 110, the first user 110 may authenticate the virtual entity 120 as being associated with a genuine entity.

In one or more embodiments, second user credential 154 serves as an additional method to authenticate the identity of the first user 110 and verify that the first avatar 114 is associated with the first user 110. This second method of user authentication is particularly useful, when the virtual environment 102 and the virtual entity 120 are managed by separate servers, wherein a first server manages the virtual environment 102 and provides the first user 110 access to the virtual environment 102 based on the first user credential 152, and a second server (e.g., virtual-world server 150) manages the virtual entity 120 within the virtual environment 102, provides access to the first user 110 to the virtual entity 120 based on the second user credential 154 and allows the first user 110 to perform virtual data interactions using the virtual entity 120. In this context, virtual environment 102 may include several virtual entities including virtual entity 120, wherein each virtual entity represents a different real-world entity/organization and access to each virtual entity is managed by a different server.

In an example banking use case, the system and methods disclosed in accordance with embodiments of the present disclosure may allow a user (e.g., first user 110) to perform data interactions within the virtual environment 102. In this context, the real-world server 130 may be owned and/or operated by a bank. The virtual-world server 150 may be operated by the same bank or may be operated by another entity. The real world-data file 134 may correspond to a real-world bank account of the first user 110 and the real-world data objects 136 may correspond to the real-world funds in the bank account of the first user 110. Similarly, virtual data file 160 may correspond to a digital wallet of the first user 110 and the virtual data objects 162 may correspond to digital currency. User data 132 may include information relating to the bank account of the first user and other information relating to a user profile of the user at the bank. Real-world data interaction history 138 may store records of real-world transactions performed by the first user 110. Virtual-world data interaction history may store records of virtual-world transactions performed by the first user 110. Virtual entity 120 may correspond to a virtual bank entity such as a virtual bank ATM, a virtual bank kiosk or a virtual bank branch.

FIG. 3 illustrates a flowchart of an example method 300 for verifying an identity of a user (e.g., first user 110) and an identity of a virtual entity (e.g., virtual entity 120) in a virtual environment 102, in accordance with one or more embodiments of the present disclosure. Method 300 may be performed by the virtual-world server 150 shown in FIG. 1.

At operation 302, virtual-world server 150 receives a first user credential 152 associated with a user (e.g., first user 110), wherein the first user credential 152 provides the user access to the virtual environment 102.

At operation 304, virtual-world server 150 authorizes, based on the first user credential 152, an avatar (e.g., first avatar 114) of the user (e.g., first user 110) to enter the virtual environment 102.

As described above, virtual-world server 150 may be configured to use a first user credential 152 collected from the first user 110, generated by the first user 110 or assigned to the first user 110 during real-world data interactions with the first user 110, to verify an identity of the first user 110 in the virtual environment 102. Thus, the first user credential 152 provides the first user 110 access to the virtual environment 102. For example, the first user credential 152 may be used by the virtual-world server 150 to verify that the first avatar 114 belongs to and is controlled by the first user 110. In one example, a retina scan of the first user 110 may have been previously collected from the first user 110 as part of a real-world data interaction with the first user 110. Information relating to the retina scan may have been stored as part of the user data 132. The retina scan of the first user 110 may be used as the first user credential 152. When the first user 110 uses the user device 104 (e.g., VR headset) to enter the virtual environment 102 via first avatar 114, the virtual-world server 150 obtains a retina scan of the first user 110 using a biometric device (e.g., biometric device 218) provided at the user device 104. The retina scan obtained via the user device is compared with the retina scan of the first user 110 stored as part of user data 132 in the real-world server 130. When the two retina scans match, virtual-world server 150 determines that the first avatar 114 is associated with the first user 110 and may authorize and allow the first avatar 114 to enter the virtual environment 102.

In another example, first user credential 152 may include a username and password generated by the first user 110 as part of registering with the real-world server 130. The virtual-world server 150 may allow the first user 110 to use the same username and password to enter the virtual environment 102 via first avatar 114.

At operation 306, virtual-world server 150 receives a second user credential 154 associated with the first user 110. The second user credential 154 provides the first avatar 114 access to a virtual entity 120 in the virtual environment 102. The second user credential 154 is associated with user data/information related to the first user 110.

As described above, virtual-world server 150 may be configured to generate a second user credential 154 that provides the first user 110 access to the virtual entity 120 within the virtual environment 102 and authorization to perform one or more virtual data interactions using the virtual entity 120. The second user credential 154 may include a passcode, a virtual token, an encrypted key, biometrics, multi-factor authentication or any other form of authentication. In one embodiment, first user 110 first enters the virtual environment 102 (e.g., via first avatar 114) using the first user credential 152 and then accesses the virtual entity 120 using the second user credential 154. Once the first avatar 114 of the first user 110 has accessed the virtual entity 120, first user 110 may perform one or more data interactions in the virtual environment 102 using the virtual entity 120.

At operation 308, virtual-world server 150 determines based on the second user credential 154 whether the first user 110 is authorized to access the virtual entity 120. If the first user 110 is not authorized to access the virtual entity 120, method 300 ends here. On the other hand, if the first user 110 is authorized to access the virtual entity 120, method 300 proceeds to operation 310 where virtual-world server 150 permits the first avatar 114 of the first user 110 to access the virtual entity 120.

At operation 312, virtual-world server 150 receives a request from the first user 110 (e.g., via first avatar 114) to authenticate the virtual entity 120.

At operation 314, in response to receiving the request from the first user 110, virtual-world server 150 accesses at least a portion of the user data/information previously collected from the first user 110.

At operation 316, virtual-world server 150 presents to the first user 110 in the virtual environment 102, the portion of the user data/information for authentication of the virtual entity 120 by the first user 110.

As described above, once the first user 110 has access to the virtual entity 120 (e.g., after providing the second user credential 154), the first user 110 may want to authenticate that the virtual entity 120 is associated with a genuine real-world entity/organization that the virtual entity 120 is supposed to represent and first user 110 intends to interact with, and not some unauthorized entity/organization or person. Virtual-world server 150 may be configured to authenticate the identity of the virtual entity 120 by presenting to the first user 110 information that was previously collected from the first user 110 or assigned to the first user 110 as part of a real-world data interaction in the real-world environment or virtual-world data interaction in the virtual environment 102. In one embodiment, the second user credential 154 may be associated with user information relating to the first user 110 stored in the real-world server 130 as well as the virtual-world server 150. The user information associated with the second user credential 154 may include user data 132 of the first user 110, real-world data interaction history 138 of first user 110, virtual-world data interaction history 164 of first user 110 and/or any other information the first user 110 previously provided to the real-world server 130 or virtual-world server 150, any information generated for the first user 110 by the real-world server 130 or virtual-world server 150 or any information the first user 110 provided access to the real-world server 130 or virtual-world server 150. When the first user 110 provides the second user credential 154 to gain access to the virtual entity 120, virtual-world server 150 may determine an identity of the first user 110 based on the user information associated with the second user credential 154. Upon request from the first user 110 to authorize the virtual entity 120, the virtual-world server 150 may retrieve a portion of the user information as stored in real-world server 130 and/or virtual-world server 150 and may present the retrieved information to the first user 110 in the virtual environment 102. An unauthorized entity or user may not possess or have access to the user information that the real-world server 130 or virtual-world server 150 may have access to. Thus, the virtual-world server 150 presenting a portion of the user information to the first user 110 is indicative of the fact that the virtual entity 120 is associated with a genuine real-world entity/organization. Based on the user information presented to the first user 110 in the virtual environment 102 (e.g., visually inspecting the presented user information), the first user 110 may confirm to the virtual-world server 150 that the virtual entity 120 is authenticated, and thereafter, may proceed to perform one or more virtual data interactions.

In one embodiment, virtual entity 120 may provide a means for the first user 110 to request the authentication of the virtual entity 120. For example, when the virtual entity 120 is a virtual device, the virtual device may include a virtual button that the first user 110 may press through the first avatar 114 to request authentication of the virtual entity 120. In another example, when the first user 110 is interacting with a virtual avatar of the virtual entity 120, the first user 110 may request authentication of the virtual entity 120 using a voice command to the virtual avatar. In response to receiving the request for authentication of the virtual entity 120 from the first user 110, virtual-world server 150 may access the real-world server 130, extract a portion of the user information and present the extracted portion of the user information to the first user 110 in the virtual environment 102. For example, virtual-world server 150 may display the extracted user information on a virtual display associated with the virtual entity 120. The first user 110 may inspect the presented user information and authorize the virtual entity 120 (e.g., by pressing a virtual button or via voice command) upon recognizing the user information.

The user information that may be presented to the first user 110 for authenticating the virtual entity may include, but is not limited to, one or more of an identity of a data file (e.g., real-world data file 134 or virtual data file 160) owned by the first user 110, an amount of data objects (e.g., real-world data objects 136 or virtual data objects 162) held in the respective data file, a record of one or more data interactions (e.g., real-world data interaction or virtual-world data interaction) previously performed by the first user 110, a safe password previously configured by the first user 110, an answer to a secret question previously provided by the first user 110, biometric information of the first user 110, a security image previously selected by the first user 110, a security word previously provided by the first user 110, a security phrase previously provided by the first user 110, an audio file, a video file.

At operation 318, virtual-world server 150 receives an indication from the first user 110 that the virtual entity 120 is authentic. For example, based on the user information presented to the first user 110 in the virtual environment 102 (e.g., visually inspecting the presented user information), the first user 110 may determine that the virtual entity 120 is authentic and indicate the same to the virtual-world server 150.

At operation 320, virtual-world server 150 receives a request initiated by the first user 110 through the first avatar 114 to perform a virtual data interaction with the virtual entity 120.

At operation 322, virtual-world server 150 initiates the virtual data interaction based on the request.

Figure 4:
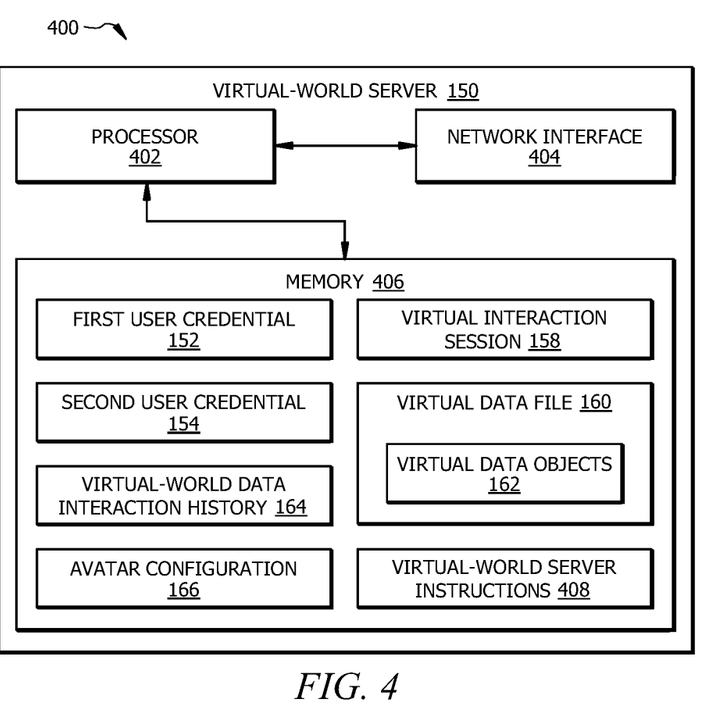
FIG. 4 illustrates an example schematic diagram of the virtual-world server shown in FIG. 1, in accordance with one or more aspects of the present disclosure.

FIG. 4 illustrates an example schematic diagram 400 of the virtual-world server 150 shown in FIG. 1, in accordance with one or more aspects of the present disclosure.

The virtual-world server 150 comprises a processor 402, a memory 406, and a network interface 404. The virtual-world server 150 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., virtual-world server instructions 408) to implement the virtual-world server 150. In this way, processor 402 may be a special-purpose computer designed to implement the functions disclosed herein. In one or more embodiments, the virtual-world server 150 is implemented using logic units, FPGAs, ASICs, DSPs, or any other suitable hardware. The virtual-world server 150 is configured to operate as described with reference to FIG. 3. For example, the processor 402 may be configured to perform at least a portion of the method 300 as described in FIG. 3.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store the first user credential 152, second user credential 154, virtual interaction session 158, virtual data file 160, virtual data objects 162, virtual-world data interaction history 164, avatar configuration 166 and the virtual-world server instructions 408. The virtual-world server instructions 408 may include any suitable set of instructions, logic, rules, or code operable to execute the virtual-world server 150.

The network interface 404 is configured to enable wired and/or wireless communications. The network interface 404 is configured to communicate data between the virtual-world server 150 and other devices, systems, or domains (e.g. user devices 104 and 106 and the real-world server 130). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

Figure 5:
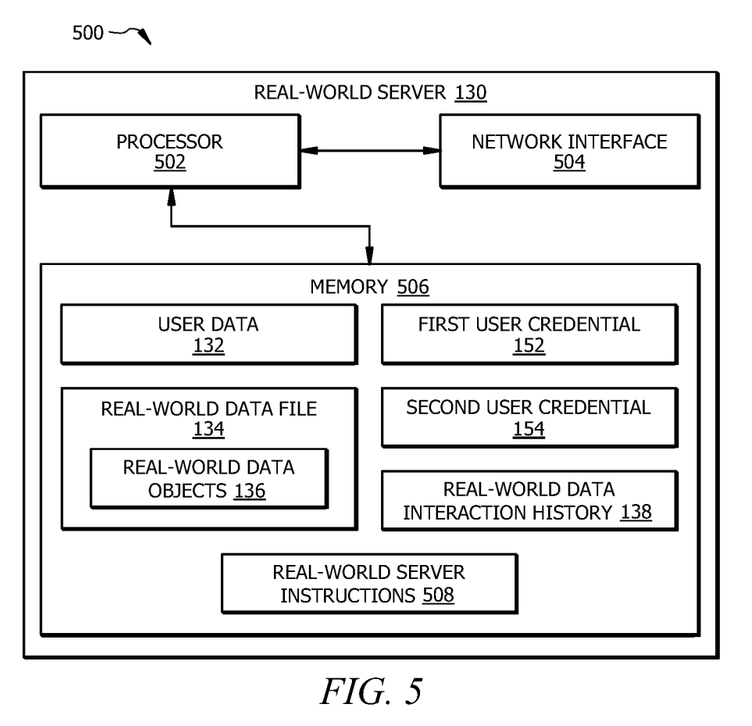
FIG. 5 illustrates an example schematic diagram of the real-world server shown in FIG. 1, in accordance with one or more aspects of the present disclosure.

FIG. 5 illustrates an example schematic diagram 500 of the real-world server 130 shown in FIG. 1, in accordance with one or more aspects of the present disclosure.

The real-world server 130 comprises a processor 502, a memory 506, and a network interface 504. The real-world server 130 may be configured as shown in FIG. or in any other suitable configuration.

The processor 502 comprises one or more processors operably coupled to the memory 506. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 506. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., real-world server instructions 508) to implement the real-world server 130. In this way, processor 502 may be a special-purpose computer designed to implement the functions disclosed herein. In one or more embodiments, the real-world server 130 is implemented using logic units, FPGAs, ASICs, DSPs, or any other suitable hardware. The real-world server 130 is configured to operate as described with reference to FIGS. 1 and 3. For example, the processor 502 may be configured to perform at least a portion of the method 300 as described in FIG. 3.

The memory 506 comprises one or more disks, tape drives, or solid-state drives, and may be used as an over-flow data storage device, to store programs when such programs are selected for execution, and to store instructions and data that are read during program execution. The memory 506 may be volatile or non-volatile and may comprise a read-only memory (ROM), random-access memory (RAM), ternary content-addressable memory (TCAM), dynamic random-access memory (DRAM), and static random-access memory (SRAM).

The memory 506 is operable to store information relating to user data 132, real-world data file 134, real-world data objects 136, first user credential 152, second user credential 154, real-world data interaction history 138 and the real-world server instructions 508. The real-world server instructions 508 may include any suitable set of instructions, logic, rules, or code operable to execute the real-world server 130.

The network interface 504 is configured to enable wired and/or wireless communications. The network interface 504 is configured to communicate data between the real-world server 130 and other devices, systems, or domains (e.g. user devices 104 and 106 and the virtual-world server 150). For example, the network interface 504 may comprise a Wi-Fi interface, a LAN interface, a WAN interface, a modem, a switch, or a router. The processor 502 is configured to send and receive data using the network interface 504. The network interface 504 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
 a memory storing a first user credential and a second user credential associated with a user; and
 at least one processor coupled to the memory, and configured to:
  receive the first user credential associated with the user, wherein the first user credential provides the user access to a virtual environment;
  authorize, based on the first user credential, an avatar of the user to enter the virtual environment;
  receive the second user credential associated with the user, wherein:
   the second user credential provides the avatar access to a virtual entity in the virtual environment;
   the second user credential is associated with user data related to the user;
  authorize, based on the second user credential, the avatar of the user to access the virtual entity;
  receive a request from the user to authenticate the virtual entity;
  in response to receiving the request, access, based on the second user credential, at least a portion of the user data previously collected from the user;
  present to the user in the virtual environment, the portion of the user data for authentication of the virtual entity by the user;
  after presenting the portion of the user data, receive an indication from the user that the virtual entity is authentic;
  receive a request initiated by the avatar of the user to perform a virtual data interaction with the virtual entity; and
  initiate the virtual data interaction based on the request.

2. The system of claim 1, wherein:
 the portion of the user data comprises a record of at least one data interaction previously performed by the user in the virtual environment or a real-world environment.

3. The system of claim 1, wherein the at least one data interaction comprises a most recent data interaction performed by the user.

4. The system of claim 1, wherein the at least one processor is further configured to:
 receive a request to configure a second avatar that visually represents the virtual entity in the virtual environment, wherein the request includes a configuration for at least one visual attribute associated with the second avatar;
generate, based on the request, a configuration for a customized second avatar; and
associate the configuration of the customized second avatar with a user profile of the user, wherein the customized second avatar is configured to visually represent the virtual entity when engaged with the avatar of the user in the virtual environment.

5. The system of claim 4, wherein:
the portion of the user data comprises a configuration of the customized second avatar;
wherein the at least one processor is further configured to:
in response to receiving the request to authenticate the virtual entity, retrieve the configuration of the customized second avatar;
configure the second avatar based on the retrieved configuration to generate the customized second avatar; and
present the customized second avatar to the user in the virtual environment.

6. The system of claim 1, wherein the portion of the user data comprises one or more of an identity of a data file owned by the user, an amount of data objects held in the data file, a record of one or more data interactions previously performed by the user, a safe password, an answer to a secret question, biometric information of the user, a security image previously selected by the user, a security word previously provided by the user, a security phrase previously provided by the user, an audio file or a video file.

7. The system of claim 1, wherein:
the portion of the user data is stored in a real-world environment; and
the at least one processor is further configured:
in response to receiving the request to authenticate the virtual entity, send a request for the portion of the user data stored in the real-world environment; and
receive the portion of the user data from the real-world environment.

8. A method for performing data interactions in a virtual environment, comprising:
receiving a first user credential associated with the user, wherein the first user credential provides the user access to the virtual environment;
authorizing, based on the first user credential, an avatar of the user to enter the virtual environment;
receiving a second user credential associated with the user, wherein:
the second user credential provides the avatar access to a virtual entity in the virtual environment;
the second user credential is associated with user data related to the user;
authorizing, based on the second user credential, the avatar of the user to access the virtual entity;
receiving a request from the user to authenticate the virtual entity;
in response to receiving the request, accessing, based on the second user credential, at least a portion of the user data previously collected from the user;
presenting to the user in the virtual environment, the portion of the user data for authentication of the virtual entity by the user;
after presenting the portion of the user data, receiving an indication from the user that the virtual entity is authentic;
receiving a request initiated by the avatar of the user to perform a virtual data interaction with the virtual entity; and
initiating the virtual data interaction based on the request.

9. The method of claim 8, wherein:
the portion of the user data comprises a record of at least one data interaction previously performed by the user in the virtual environment or a real-world environment.

10. The method of claim 8, wherein the at least one data interaction comprises a most recent data interaction performed by the user.

11. The method of claim 8, further comprising:
receiving a request to configure a second avatar that visually represents the virtual entity in the virtual environment, wherein the request includes a configuration for at least one visual attribute associated with the second avatar;
generating, based on the request, a configuration for a customized second avatar; and
associating the configuration of the customized second avatar with a user profile of the user, wherein the customized second avatar is configured to visually represent the virtual entity when engaged with the avatar of the user in the virtual environment.

12. The method of claim 11, wherein:
the portion of the user data comprises a configuration of the customized second avatar;
further comprising:
in response to receiving the request to authenticate the virtual entity, retrieving the configuration of the customized second avatar;
configuring the second avatar based on the retrieved configuration to generate the customized second avatar; and
presenting the customized second avatar to the user in the virtual environment.

13. The method of claim 8, wherein the portion of the user data comprises one or more of an identity of a data file owned by the user, an amount of data objects held in the data file, a record of one or more data interactions previously performed by the user, a safe password, an answer to a secret question, biometric information of the user, a security image previously selected by the user, a security word previously provided by the user, a security phrase previously provided by the user, an audio file or a video file.

14. The method of claim 8, wherein:
the portion of the user data is stored in a real-world environment; and
further comprising:
in response to receiving the request to authenticate the virtual entity, sending a request for the portion of the user data stored in the real-world environment; and
receiving the portion of the user data from the real-world environment.

15. A non-transitory computer-readable medium for performing data interactions in a virtual environment, the computer-readable medium storing instructions which when executed by a processor cause the processor to:
receive a first user credential associated with the user, wherein the first user credential provides the user access to the virtual environment;
authorize, based on the first user credential, an avatar of the user to enter the virtual environment;
receive a second user credential associated with the user, wherein:
the second user credential provides the avatar access to a virtual entity in the virtual environment;

the second user credential is associated with user data related to the user;

authorize, based on the second user credential, the avatar of the user to access the virtual entity;

receive a request from the user to authenticate the virtual entity;

in response to receiving the request, access, based on the second user credential, at least a portion of the user data previously collected from the user;

present to the user in the virtual environment, the portion of the user data for authentication of the virtual entity by the user;

after presenting the portion of the user data, receive an indication from the user that the virtual entity is authentic;

receive a request initiated by the avatar of the user to perform a virtual data interaction with the virtual entity; and initiate the virtual data interaction based on the request.

16. The non-transitory computer-readable medium of claim 15, wherein:

the portion of the user data comprises a record of at least one data interaction previously performed by the user in the virtual environment or a real-world environment.

17. The non-transitory computer-readable medium of claim 15, wherein the at least one data interaction comprises a most recent data interaction performed by the user.

18. The non-transitory computer-readable medium of claim 15, further comprising instructions that cause the processor to:

receive a request to configure a second avatar that visually represents the virtual entity in the virtual environment, wherein the request includes a configuration for at least one visual attribute associated with the second avatar;

generate, based on the request, a configuration for a customized second avatar; and associate the configuration of the customized second avatar with a user profile of the user, wherein the customized second avatar is configured to visually represent the virtual entity when engaged with the avatar of the user in the virtual environment.

19. The non-transitory computer-readable medium of claim 18, wherein:

the portion of the user data comprises a configuration of the customized second avatar;

further comprising instructions that cause the processor to:

in response to receiving the request to authenticate the virtual entity, retrieve the configuration of the customized second avatar;

configure the second avatar based on the retrieved configuration to generate the customized second avatar; and present the customized second avatar to the user in the virtual environment.

20. The non-transitory computer-readable medium of claim 15, wherein the portion of the user data comprises one or more of an identity of a data file owned by the user, an amount of data objects held in the data file, a record of one or more data interactions previously performed by the user, a safe password, an answer to a secret question, biometric information of the user, a security image previously selected by the user, a security word previously provided by the user, a security phrase previously provided by the user, an audio file or a video file.

* * * * *